UNITED STATES PATENT OFFICE.

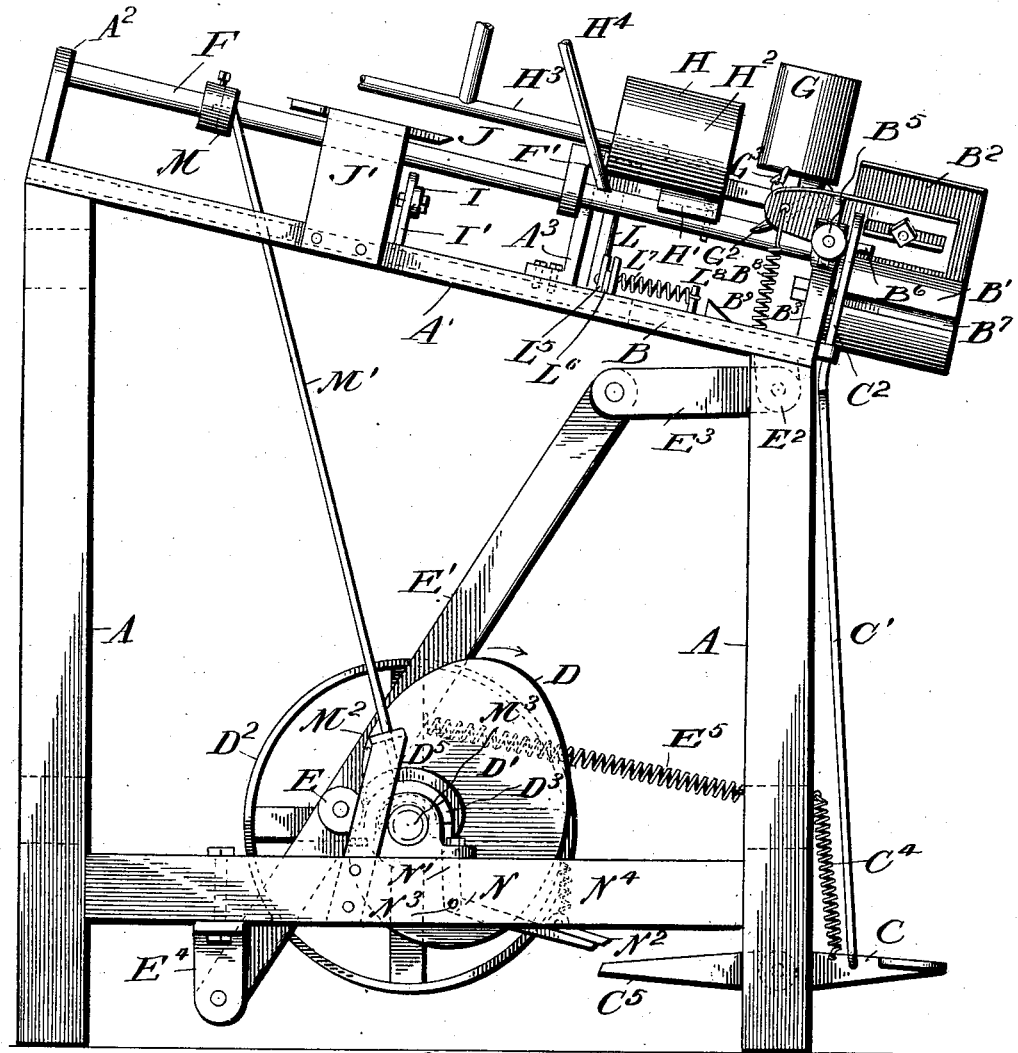

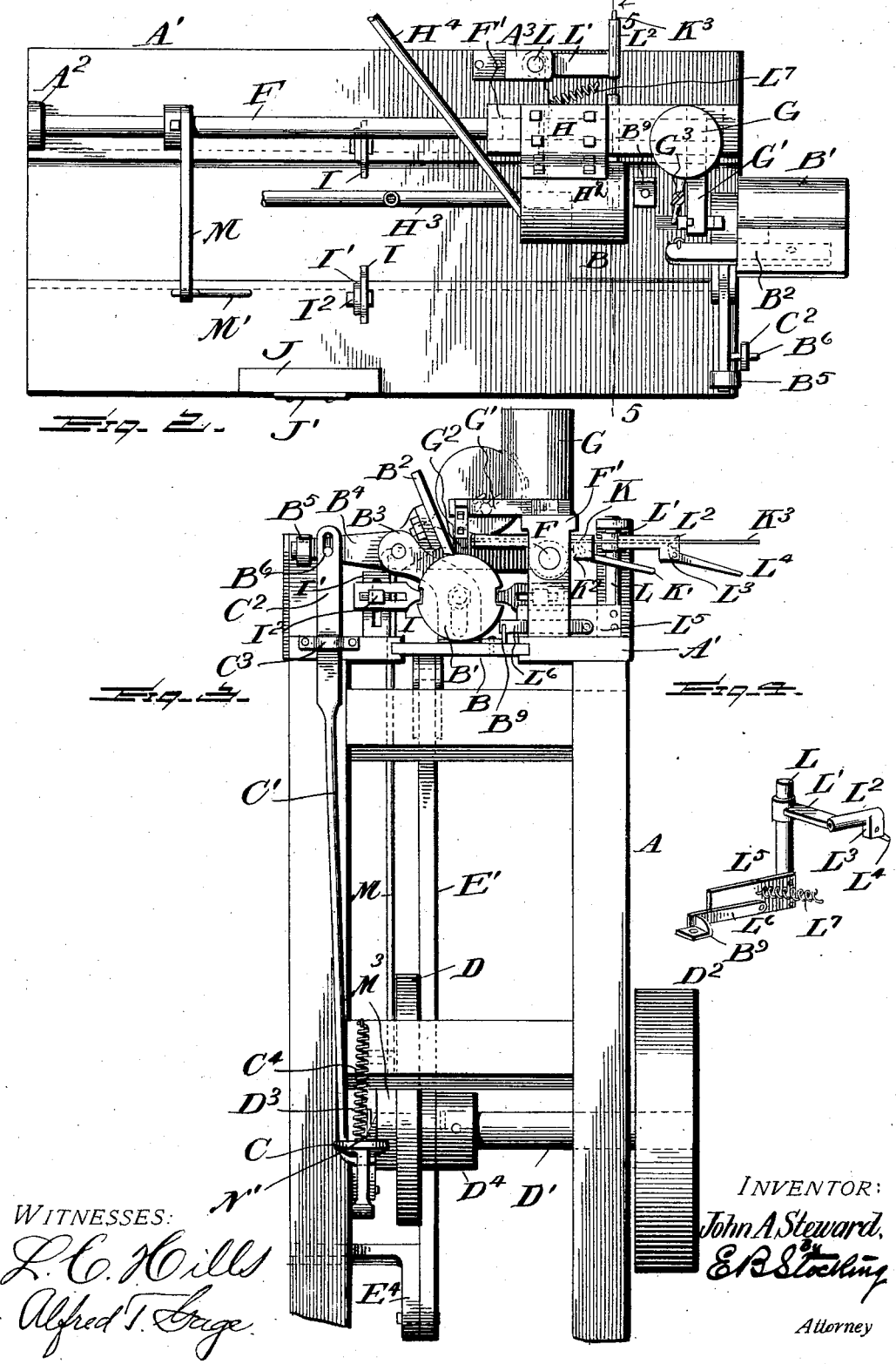

JOHN A. STEWARD, OF EAST CLARENDON, VERMONT.

SOLDERING-MACHINE FOR CAN-SEAMS.

SPECIFICATION forming part of Letters Patent No. 678,442, dated July 16, 1901.

Application filed November 8, 1900. Serial No. 35,845. (No model.)

*To all whom it may concern:*

Be it known that I, JOHN A. STEWARD, a citizen of the United States, residing at East Clarendon, in the county of Rutland, State of Vermont, have invented certain new and useful Improvements in Soldering-Machines for Can-Seams, of which the following is a specification, reference being had therein to the accompanying drawings.

This invention relates to soldering-machines for can-seams, and particularly for automatically accomplishing the entire soldering function for the side seam of sheet-metal can-bodies or other receptacles.

The invention has for its object to provide improved means for retaining the can in position for the soldering action and also for holding the free edges of the lap-joint at such a time.

A further object of the invention is to provide a novel structure of feeding device for the solder by means of which it may be fed in the movement of the sliding table at the proper time to introduce the solder upon the seam of the can as the same passes under the soldering-iron.

A further object of the invention is to provide automatically-operating devices for removing the can-holding knife from the can when the soldering operation is completed and also for elevating the soldering-iron and acid-applying devices when the sliding table and form are returned to their initial position.

A further object of the invention is to apply an improved form of driving device for automatically actuating the several parts from a single driving-shaft and so timing their operation as to perform a complete soldering operation during each of their actuated periods.

Other objects and advantages of the invention will hereinafter appear in the following description, and the novel features thereof will be particularly pointed out in the appended claims.

In the drawings, Figure 1 is a side elevation of the machine. Fig. 2 is a top plan thereof. Fig. 3 is a front view. Fig. 4 is a perspective of the solder-feeding device, and Fig. 5 is a vertical section on the line 5 5 of Fig. 2 with the parts in position for soldering and showing in dotted lines the position of the holding-knife when elevated.

Like letters of reference indicate like parts throughout the several figures of the drawings.

In the drawings the letter A designates a frame which may be of any suitable construction and is provided at its upper portion with a support A', which, if desired, may be inclined downward toward the front of the machine, within which a sliding table or carrier B is mounted to reciprocate. This table B has supported thereon a form of any desired conformation—for instance, cylindrical, as shown—when a round can is to be soldered. At the rear of this form there is mounted a holding-knife $B^2$ by means of a bracket $B^3$, rising from the sliding table B, as shown by full and dotted lines in Fig. 3. The knife $B^2$ may be of any suitable material, preferably of slate, and presses upon the can at one side of the joint, so as to hold the lapped ends in proper position for soldering. The knife is mounted at one end of a pivoted angle-lever $B^4$, the outer end of which is provided with a frictional roller $B^5$ and upon one face with a point or stud $B^6$. This structure provides for the elevating of the knife when it is desired to introduce a can upon the form. For the purpose of effecting the elevation a treadle C is pivoted at the lower portion of the frame A and actuated by means of a rod C', with the slotted bar $C^2$ mounted to reciprocate through a keeper $C^3$, and into the slot of which the pin $B^6$ from the lifting-lever of the knife projects when the knife is at the extreme front end of the machine. This permits the knife to be elevated by means of the treadle, and as soon as the same is released the knife is restored to its initial position by means of the spring $C^4$, extended from the treadle to the frame A, and the spring $B^8$, between the knife and table.

The sliding table B is reciprocated in the frame by means of a cam D, of suitable configuration, loosely mounted upon a driving-shaft D', upon the end of which is a driving-wheel $D^2$, properly secured thereto. For the purpose of connecting this cam with the driving-shaft D' any suitable form of clutch mechanism may be used. For instance, a spring clutch-pin D³ is mounted in the hub of the cam D and normally pressed into engagement with a series of apertures in a collar D⁴, secured to the shaft D', by means of the spring D⁵, pressing against the head of said clutch-pin. Means will hereinafter be described for operating this clutch-pin. The cam D bears against a suitable friction-roller E, mounted upon the lever E', which is connected to a depending lug E² from the sliding table B by means of the link E³. The lower end of the lever E' is pivotally mounted in a suitable depending lug E⁴, carried by the frame A. It will be seen that a rotation of the cam D from left to right will move the sliding table toward the rear of the machine, after which movement it will return to its initial position by means of gravity incident to its inclination and assisted by a suitable tension-spring E⁵, connected at opposite ends to the lever and the frame. At opposite ends of the inclined face A' of the framework and preferably at one side thereof supporting-standards A² are provided, and within the same there is journaled a rock-shaft F, having thereon a bracket F', adapted to support the acid-tank G and accessory devices and also the soldering-iron and heater H. This bracket F' is suitably secured upon the rock-shaft F, so as to rotate therewith, and at the front portion of the bracket the acid-tank G is supported by any suitable means. An arm G' extends outward from this tank and supports an acid-applying brush G², adapted to wipe over the joint of the can-body, and this brush is connected by means of a suitable supply-pipe G³, extending between the tank and brush and provided with any desired form of regulating cock or valve for determining the amount of acid to escape upon the brush.

At the rear of the acid-tank the iron-heater H is suitably supported, so that the soldering-iron H' will lie in the line of the acid-brush and of the can-seam. The upper end of this iron is inclosed within a casing H² and heated by means of any suitable form of burner—for instance, a gas-burner supplied from a pipe H³, suitably located so as to be out of the line of movement of the form B' and devices carried by the moving table. At the rear of the heater a cold-air pipe H⁴ is disposed, so as to discharge upon the seam of the can after the soldering action, and thereby cool and quickly set the solder, so that the can can be discharged from the form. This discharge is effected by means of an adjustable finger I, supported by a slotted post I' by means of a clamp-nut I². These are located at opposite sides of the sliding table and adapted to coöperate with and move through grooves or ways B⁷, provided in opposite sides of the form B', by which means the can is pushed off the form in its continued movement toward the rear. The adjustment of the arms I permits any desired extent of contact. Before this removal of the can is effected, however, the knife B' is lifted from contact with the can at the seam by means of a track-cam J, carried by a vertical standard J'. The roll B⁵ upon the angle-lever carrying the knife rides beneath the track-cam J, thus elevating the knife B² from the can and placing the spring B⁸ under tension, which spring normally serves to hold the knife in firm contact with the frame.

At one side of the soldering-iron a solder-feeding device is located, and. consists of a tubular sleeve K, having supported thereon a holding-pawl K', pivoted in a casing K², so as to engage and hold the stick of solder K³ against backward movement. The forward feeding is effected by means of a rotary shaft L, having at its upper end an angle-arm carrying a tubular sleeve L² in the line of feed of the stick of solder. This sleeve L² is provided with a depending casing L³, adapted to support a holding-pawl L⁴, by which the solder is gripped when the sleeve is moved in one direction, and the sleeve moves freely upon the solder in the opposite direction. The vertical shaft L is supported in any suitable bearing—for instance, by means of a bracket A³, rising from the face of the table—and is provided at its lower portion with a laterally-extending arm L⁵, composed of opposite members, between which a latch L⁶ is pivoted and extends outward into the path of an inclined post B⁹, carried upon the movable table B. In the movement of the carriage toward the rear of the machine the straight face of this post engages the latch L⁶ and rotates the solder-feed so that the solder is forced into contact with the heated iron during the continued movement of the can beneath the iron. In the return movement of the table the inclined face of the post B⁹ engages beneath the lower edge of the latch L⁶ and raises the same, thus preventing any movement of the solder-feed.

If the can has been discharged from the form, it is desirable that the tank and soldering-iron be elevated, so that no contact will be had with the form during its return movement. These parts, as previously stated, are mounted upon a rock-shaft F, and this shaft is automatically rotated by means of a crank-arm M, secured thereto and having a pivoted rod M' extending from its outer end downward through a guide-plate M² and rests upon a cam-face M³, secured to and movable with the cam D. This cam M³ is clutched into movable connection with the driving-shaft by means of the clutch-pin D³, heretofore described, and simultaneously with the connection of the cam D. For the purpose of operating this clutch-pin D³ to connect and disconnect the cam from the driving-shaft D' an angle-lever N is suitably pivoted to the frame and provided at one end with a clutch-finger N', adapted to engage beneath the head of the clutch-pin D³ and withdraw the same from its socket in the collar D⁴, thus placing the spring D⁵ under tension. The movement of the angle-lever N to effect this object is accomplished as the inner end C⁵ of the treadle C descends. In this movement the end C' engages a pivoted pawl or block N², carried upon the end of the lever N, throwing the inner finger end N' outward upon the pivot N³ out of engagement with the clutch-pin and allowing the same to pass into position to drive the cams from the shaft D'. This leaves the parts in the position shown in Fig. 1, and the pivoted block N² permits the return of the treadle when the knife is again raised without affecting the clutch-lever by lifting the block in its upward movement. A spring N⁴ is provided for normally throwing the end N' of the lever into the path of the clutch-pin in order that after a complete rotation has been made the pin will be withdrawn and the parts released from the driving mechanism.

In operation, the sliding table being at the front of the machine, as shown in Fig. 1, the operator places upon the form B' a suitably-curved can-blank, bringing the lap-joint or seam at the upper central portion of the form. While performing this step the knife B² is lifted from the form or cylinder by means of the treadle C, the inner end C⁵ thereof have been raised above the clutch-lever N. The can-body is placed on the form, with the edges of the tin lapped under the knife B², with the overlapping edge projecting sufficiently to admit the solder. (See Fig. 5.) When the pressure is removed from the treadle C, the spring C⁴ raises the outer end of the same and brings the end C⁵ into contact with the pivoted block upon the end of the clutch-lever N, thus throwing the finger from under the clutch-pin and permitting said pin to connect the driving and lifting cams with the driving-shaft. As the pressure is removed from the treadle the spring B³ draws the knife into firm contact with the can-body, making a smooth and even joint. The movement of the cam from left to right now causes a simultaneous movement of the sliding table B toward the rear of the machine. In this movement the rod N', which at this time is holding the acid-brush and soldering-iron above the plane of the form, is permitted to descend by passing over or beyond the extended face of the cam M³, thus bringing the brush and iron into proper relation with the can before the same reaches that point. The said can is first passed under the acid-brush, applying the acid evenly thereto, and then beneath the soldering-iron H'. Before the can reaches the iron the post B⁹ engages the latch L⁶, thus partially rotating the shaft L and actuating a continued feed of the solder into contact with one face of the iron (see Fig. 5) and continues this feed for the proper period to insure a soldering of the complete joint of the can. When the post B⁹ has passed beyond the latch L⁶, the same will be restored to its initial position by means of a suitable retracting-spring L⁷, extending from the latch to a post L⁸, upon the frame. In the continued movement of the can the solder at the seam is cooled by the air from the pipe H⁴, the knife raised by means of the track-cam J engaging the roller B⁵, and finally the can removed from the form by means of the fingers I. It should be stated that in the return movement of the solder-feed the pawl L³ permits the sleeve I² to move upon the stick of solder without movement of the latter. After the can-body has been removed from the form the continued movement of the cam M³ rotates the rock-shaft F, lifting the acid-tank and soldering-iron above the path of the form, while the face of the cam D reaches such a position that the retracting-spring E⁵, together with the weight of the sliding table, restores the same to its initial position. As the parts assume this position or immediately preceding such time the head of the clutch-pin D³ in its rotation is engaged by the end N' of the clutch-lever, which has been thrown into contacting position by the spring N⁴. The clutch is thus withdrawn and the driving-shaft disconnected from further operation until the treadle C is again actuated to raise the knife B², as stated in the beginning of the operation. In the return movement of the parts to their initial position it will be seen that the post B⁶, carried by the angle-lever of the knife B², will pass through the slotted end of the bar C², this connecting the parts for the next operation.

It will be obvious that changes may be made in the details of construction and configuration without departing from the spirit of the invention and that such changes as are evident to a mechanic skilled in the art may also be effected.

Having described my invention, what I claim as new, and desire to secure by Letters Patent, is—

1. In a can-soldering machine, the combination of a frame, a traveling table thereon, a form carried by said table, a holding-knife adapted to bear upon said form, an acid-applying device and a soldering device successively supported in the path of travel of said form, and means for elevating said knife from said form; substantially as specified.

2. In a can-soldering machine, the combination of a frame, a traveling table thereon, a form carried by said table, a holding-knife adapted to bear upon said form, an acid-applying device and a soldering device successively supported in the path of travel of said form, means for elevating said knife from said form when stationary, and means for automatically elevating said knife during the travel of the table and form; substantially as specified.

3. In a can-soldering machine, the combination of a frame, a traveling table thereon, a form carried by said table, a holding-knife adapted to bear upon said form, a lever extending from said knife and provided with a projection, a lifting-rod fixed to said frame and provided with an aperture into which said projection extends when the table is at one extreme of its movement, and means for reciprocating said lifting-rod; substantially as specified.

4. In a can-soldering machine, the combination of a frame, a traveling table thereon, a form carried by said table, a holding-knife adapted to bear upon said form, a lever extending from said knife and provided with a projection, a lifting-rod fixed to said frame and provided with an aperture into which said projection extends when the table is at one extreme of its movement, means for reciprocating said lifting-rod, and a fixed track-cam carried by the frame and adapted to engage the free end of the knife-lever during the travel of the same with the table; substantially as specified.

5. In a can-soldering machine, the combination of a frame, a table traveling thereon, means to reciprocate said table, a form carried by said table, an acid-brush and soldering-iron above said form, and means for automatically raising said brush and iron from said form; substantially as specified.

6. In a can-soldering machine, the combination of a frame, a table traveling thereon, means to reciprocate said table, a form carried by said table, an acid-brush and soldering-iron disposed above said form, means for automatically raising said brush and iron from said form, a knife adapted to rest upon said form, means for raising said knife when the form is at rest; substantially as specified.

7. In a can-soldering machine, the combination of a frame, a table traveling thereon, means to reciprocate said table, a form carried by said table, an acid-brush and soldering-iron disposed above said form, means for automatically raising said brush and iron from said form, a knife adapted to rest upon said form, means for raising said knife when the form is at rest, a solder-feeding device, and means carried by the table for actuating the same; substantially as specified.

8. In a can-soldering machine, the combination of a frame, a table traveling thereon, means to reciprocate said table, a form carried by said table, an acid-brush and soldering-iron disposed above said form, means for automatically raising said brush and iron from said form, a knife adapted to rest upon said form, means for raising said knife when the form is at rest, a solder-feeding device, means carried by the table for actuating the same, and means for automatically elevating said knife in the travel of the table; substantially as specified.

9. In a can-soldering machine, the combination of a frame, a table traveling thereon, means to reciprocate said table, a form carried by said table, an acid-brush and soldering-iron disposed above said form, means for automatically raising said brush and iron from said form, an iron adapted to rest upon said form, means for raising said knife when the form is at rest, a solder-feeding device, means carried by the table for actuating the same, means for automatically elevating said knife in the travel of the table, and means for stripping a can from said form in the continued movement thereof; substantially as specified.

10. In a can-soldering machine, the combination of a frame, a table traveling thereon, means to reciprocate said table, a form carried by said table, an acid-brush and soldering-iron disposed above said form, means for automatically raising said brush and iron from said form, a knife adapted to rest upon said form, means for raising said knife when the form is at rest, a solder-feeding device, means carried by the table for actuating the same, means for automatically elevating said knife in the travel of the table, means for stripping a can from said form in the continued movement thereof, a driving-shaft, a feeding-cam thereon for moving said table, and an elevating-cam upon said shaft for raising said brush and iron; substantially as specified.

11. In a can-soldering machine, the combination with a frame, of a traveling table thereon, a can-holding form supported upon said table, a soldering-iron, a rock-shaft upon said frame, a sleeve carried by an arm from said rock-shaft and provided with a solder-clutching device, a lever extending from said rock-shaft into the path of said table, and means carried by said table for oscillating said lever; substantially as specified.

12. In a can-soldering machine, the combination of a frame, a traveling table thereon, a can-holding form supported upon said table, a soldering-iron, a rock-shaft supported upon said frame, a sleeve carried by an arm from said rock-shaft and provided with a solder-clutching device, a lever extending from said rock-shaft, a latch upon said lever and extending into the path of said table, and a lug carried by said table having an inclined face adapted to lift said latch in the return movement of the table; substantially as specified.

13. In a can-soldering machine, a solder-feeding device comprising a fixed sleeve having a solder-holding pawl, a movable oscillating sleeve provided with a solder-holding pawl, a rock-shaft having an arm adapted to carry said movable sleeve, a lever at the lower end of said rock-shaft, a latch pivoted to said lever and projecting into the path of a movable member in order to oscillate the lever, and means for restoring said lever to its initial position; substantially as specified.

14. In a can-soldering machine, the combination of a frame, a table thereon, a holding-knife supported from said table, a lever extending beyond the pivot of the knife-holding means, a projecting lug from said lever, a slotted lifting-bar mounted to reciprocate at the front of said frame, and a pivoted treadle adapted to operate said bar to bring the slot therein into alinement with the lug upon the knife-lever; substantially as specified.

15. In a can-soldering machine, the combination of a frame, a table thereon, a holding-knife supported from said table, a lever extending beyond the pivot of the knife-holding means, a projecting lug from said lever, a slotted lifting-bar mounted to reciprocate at the front of said frame, a pivoted treadle adapted to operate said bar to bring the slot therein into alinement with the lug upon the knife-lever, a roll upon the free end of said lever, and a fixed track-cam carried by the frame and adapted to depress said roll in the travel of said knife-lever; substantially as specified.

16. In a can-soldering machine, the combination with a frame, of a traveling table thereon, an acid-brush and soldering-iron mounted above said table, means for elevating the same from said table, a driving-shaft having loosely mounted thereon a cam for feeding the table and a cam for lifting the brush and iron, an automatic clutch for connecting said cam to said driving-shaft, a pivoted clutch-finger adapted to render said clutch inoperative, and a treadle having a projection adapted to operate said finger; substantially as specified.

17. In a can-soldering machine, the combination with a frame, of a traveling table thereon, an acid-brush and soldering-iron mounted above said table, means for elevating the same from said table, a driving-shaft having loosely mounted thereon a cam for feeding the table and a cam for lifting the brush and iron, an automatic clutch for connecting said cam to said driving-shaft, a pivoted clutch-finger adapted to render said clutch inoperative, a treadle having a projection adapted to operate said finger, a pivoted pawl mounted upon the lever of said finger to permit a return movement of the treadle projection without affecting the clutch; substantially as specified.

18. In a can-soldering machine, the combination with a frame, of a movable table thereon provided with a form, an acid-brush and soldering-iron movably supported above said form, a holding-knife adapted to engage said form, means controlled by the operator for raising said knife from said form, an automatic device for moving said table when said knife returns to the surface of the form, a solder-feed, means carried by the table to automatically actuate said feed, an automatic knife-raising device adapted to raise the knife, and automatically-controlled means for elevating the brush and iron above the form; substantially as specified.

19. In a can-soldering machine, the combination of a frame, a traveling table mounted thereon, a lever adapted to actuate said table, a rock-shaft extending longitudinally of said table, an acid-applying device and soldering-iron supported from said rock-shaft, a crank-arm extending from said shaft, a raising-rod extending downward from said arm, a driving-shaft carried by said frame, a feeding-cam upon said shaft adapted to engage said table-lever, and an elevating-cam carried by said shaft and adapted to reciprocate said elevating-rod; substantially as specified.

20. In a can-soldering machine, the combination of a frame, a traveling table mounted thereon, a lever adapted to actuate said table, a rock-shaft extending longitudinally of said table, an acid-applying device and soldering-iron supported from said rock-shaft, a crank-arm extending from said shaft, a raising-rod extending downward from said arm, a driving-shaft carried by said frame and provided with a fixed collar, a feeding-cam upon said shaft adapted to engage said table-lever, an elevating-cam carried by said shaft and adapted to reciprocate said elevating-rod, a spring-actuated clutch-pin carried by the hub of said cams and adapted to engage said collar, a clutch-finger adapted to withdraw said pin from said collar, a lever adapted to oscillate said clutch-finger, a pivoted pawl upon said lever, means for normally throwing said finger into the path of said clutch-pin, and a treadle having a projection adapted to engage and oscillate the clutch-finger in the downward movement of the actuating projection; substantially as specified.

21. In a can-soldering machine, the combination of a frame, a traveling table thereon, a lever adapted to actuate said table, a rock-shaft extending longitudinally of said table, an acid-applying device and soldering-iron supported from said rock-shaft, a crank-arm extending from said shaft, a raising-rod extending downward from said arm, a driving-shaft carried by said frame, a feeding-cam upon said shaft adapted to engage said table-lever, an elevating-cam carried by said shaft and adapted to reciprocate said elevating-rod, a fixed collar upon said shaft, a spring-actuated clutch-pin carried by the hub of said cams and adapted to engage said collar, a clutch-finger adapted to withdraw said pin from said collar, a lever adapted to oscillate said clutch-pin, a pivoted pawl upon said lever, means for normally throwing said finger into the path of said clutch-pin, a treadle having a projection to engage and oscillate the clutch-finger in the downward movement of the actuating projection, a knife pivotally mounted above said table, a lever extending from said knife and provided with a projecting pin or lug, a lifting-bar slidably mounted upon said frame and provided with a slot adapted to receive said pin or lug, and a connecting-rod extending from said bar to the treadle for operating the clutch mechanism; substantially as specified.

22. In a can-soldering machine, the combination of a traveling table and form thereon having grooves or ways in its opposite sides, and stripping-fingers mounted for vertical and horizontal adjustment upon said frame at opposite sides of the table and adapted to traverse said grooves or ways to remove a can from the form; substantially as specified.

23. In a can-soldering machine, the combination with a frame, of a movable table provided with a form, means for reciprocating said table, means for clamping a can-joint in engagement with said form, means for automatically lowering into contacting position an acid-applying device and a soldering-iron, means for automatically feeding a stick of solder to said iron in the movement of the carriage, means for automatically releasing said can-holding device in the continued movement of the carriage, and means for engaging and stripping from the form a soldered can; substantially as specified.

24. In a can-soldering machine, the combination with a frame, of a movable table provided with a form, means for reciprocating said table, means for clamping a can-joint in engagement with said form, means for automatically lowering into contacting position an acid-applying device and a soldering-iron, means for automatically feeding a stick of solder to said iron in the movement of the carriage, means for automatically releasing said can-holding device in the continued movement of the carriage, means for engaging and stripping from the form a soldered can, means for elevating said acid-applying device and soldering-iron, and means for releasing the several actuating devices from their driving-shaft after the completion of the single soldering operation; substantially as specified.

25. In a can-soldering machine, a frame provided with a centrally-disposed traveling table, a form thereon, a holding-knife adapted to engage said form and provided with an extended lever beyond its pivot, a rock-shaft extending parallel with the path of said table, a bracket supported upon said rock-shaft, an acid receptacle and applying device supported from said bracket, a soldering-iron supported from said bracket, a solder-feed device at one side of said iron and having an operating-lever extending into the path of said table, stripping-fingers at opposite sides of said table adapted to engage a can upon said form, a horizontally-disposed track-cam adapted to engage the lever of said holding-knife and depress the same to elevate the knife from the form, and means for actuating said rock-shaft; substantially as specified.

In testimony whereof I affix my signature in presence of two witnesses.

JOHN A. STEWARD.

Witnesses:
   FRED. C. SPENCER,
   JUSTIN BATCHELLER.